United States Patent
Matsumura et al.

(10) Patent No.: US 10,758,060 B2
(45) Date of Patent: Sep. 1, 2020

(54) COVER MATERIAL FASTENING CLIP

(71) Applicant: YKK Corporation, Tokyo (JP)

(72) Inventors: Genta Matsumura, Tokyo (JP);
Shinsuke Saiga, Seoul (KR);
Yoshitomo Iyoda, Tokyo (JP);
Takefumi Adachi, Tokyo (JP)

(73) Assignee: YKK Corporation (JP)

( * ) Notice: Subject to any disclaimer, the term of this patent is extended or adjusted under 35 U.S.C. 154(b) by 64 days.

(21) Appl. No.: 16/096,399

(22) PCT Filed: Apr. 27, 2016

(86) PCT No.: PCT/JP2016/063236
§ 371 (c)(1),
(2) Date: Oct. 25, 2018

(87) PCT Pub. No.: WO2017/187566
PCT Pub. Date: Nov. 2, 2017

(65) Prior Publication Data
US 2019/0142181 A1   May 16, 2019

(51) Int. Cl.
*A47C 31/02* (2006.01)
*B68G 7/05* (2006.01)
*F16B 2/22* (2006.01)

(52) U.S. Cl.
CPC ............ *A47C 31/023* (2013.01); *A47C 31/02* (2013.01); *B68G 7/05* (2013.01); *F16B 2/22* (2013.01)

(58) Field of Classification Search
CPC ........ A47C 31/023; A47C 31/02; B68G 7/05; F16B 2/22
See application file for complete search history.

(56) References Cited

U.S. PATENT DOCUMENTS 8,857,018 B2 * 10/2014 Murasaki ............. A47C 31/023
24/297
2012/0284974 A1 * 11/2012 Yamamoto ........... A47C 31/023
24/458
(Continued)

FOREIGN PATENT DOCUMENTS

| JP | 2014-204780 A | 10/2014 |
| WO | 2013-069114 A1 | 5/2013 |
| WO | 2015-063944 A1 | 5/2015 |

OTHER PUBLICATIONS

English translation of JP 2014-204780A, retrieved from Espacenet on Feb. 24, 2019. (19-pages.) (Year: 2020).*

(Continued)

*Primary Examiner* — Robert Sandy
(74) *Attorney, Agent, or Firm* — Kilpatrick Townsend & Stockton LLP

(57) ABSTRACT

A cover-material fastening clip includes a locking portion having a guide piece and a hook which includes an extension portion and a distal end portion. The guide piece extends includes a bent portion bent and extended toward the distal end portion. An insertion opening having a predetermined gap and allowing a wire to be inserted therethrough is positioned between the bent portion and the distal end portion. A distal end portion of the guide piece extending from the bent portion is an elastic piece portion being elastically deformed to be spaced from the distal end portion and to widen the insertion opening. In a part of the locking portion, which is located within a range, in which the elastic piece portion can be elastically deformed and thus moved, an escape space is provided to allow a distal end of the elastic piece portion to be positioned therein.

6 Claims, 8 Drawing Sheets

(56) References Cited

U.S. PATENT DOCUMENTS

2014/0352117 A1 12/2014 Murasaki
2016/0264030 A1 9/2016 Saiga et al.

OTHER PUBLICATIONS

International Search Report, PCT Patent Application No. PCT/JP2017/063236, dated Jul. 26, 2016.
Written Opinion, PCT Patent Application No. PCT/JP2017/063236, dated Jul. 26, 2016.

* cited by examiner

COVER MATERIAL FASTENING CLIP

TECHNICAL FIELD

The present invention relates to a cover-material fastening clip used for fastening a cover material intended to cover a surface of chairs, seats or the like.

BACKGROUND ART

Conventionally, in chairs used indoors, vehicle seats or the like, ones are often used, in which a cushion material or flexible pad is installed on a part thereof to be touched by a human body, such as a seat surface or a back rest, and then a surface thereof is covered with a cover material. Various structures are employed to fix the cover material. In order to fix and externally conceal the cover material, a structure is known, in which a wire as a to-be-locked member is arranged in a groove of a cushion material, cover-material fastening clips are arrayed on an end edge of the cover material, and then the clips are engaged with the wire, thereby fastening the cover material. Each of the clips has a chuck portion configured to be locked to a locking end of a locking end member attached to the cover material and a hook portion configured to be hooked and locked on the wire provided in the groove of the cushion material. In order to facilitate an operation of hooking the hook portion onto the wire, various shapes are proposed for the hook portion.

For example, a fastening clip disclosed in Patent Document 1 includes a chuck portion configured to be coupled to a hanging portion of a cushion cover and a hook portion configured to be hooked on a fastening wire in a hanging groove of a cushion pad. The hook portion has a claw-shaped hook piece and a guide piece arranged to oppose the hook piece. The guide piece is configured to cover an opening of the hook piece when the guide piece is in a free state, to be bent as the guide piece is pressed against the fastening wire, and then to return to the free state after the guide piece guides the fastening wire to a position, at which the fastening wire is hooked on the hook piece. The guide piece is shaped to extend toward the hook piece and is configured to be pressed and bent in a direction perpendicular to an extending direction thereof as the guide piece is pressed against the fastening wire.

Also, a cover-material fastening clip disclosed in Patent Document 2 is provided with a locking portion configured to be locked on a locking end member provided on an end edge of a cover material and a hook configured to be locked on a wire arranged in a cushion material. The hook is provided below the locking portion, and the hook is provided with an extension portion extending downward from the locking portion and a claw-shaped portion extending laterally from a distal end of the extension portion. The locking portion is provided with a wire guide piece. The wire guide piece extends downward from the locking portion and is provided with a bent portion in the middle thereof to be bent and extended toward a distal end portion of the claw-shaped portion. The wire guide piece is positioned such that a wire insertion opening narrower than a diameter of the wire is formed between the guide piece and the distal end portion of the claw-shape portion. When the cover-material fastening clip is locked on the wire, the wire insertion opening is pressed against the wire, and as a result, the wire guide piece and the extension portion or claw-shape portion of the hook are elastically deformed, thereby widening the wire insertion opening and thus allowing the wire to pass therethrough. After the wire passes through the wire insertion opening, the elastic deformation is restored so that the wire cannot pass therethrough back, thereby ensuring a reliable locking of the cover-material fastening clip.

CITATION LIST

Patent Document

Patent Document 1: Japanese Patent Application Publication No. 2014-204780
Patent Document 2: WO2015/063944

SUMMARY OF INVENTION

Problems to be Solved

In the case of Patent Document 1 of the above background arts, the guide piece in the free state covers the opening in such a manner that the guide piece and the hook piece are generally flush with each other. Accordingly, upon attachment to the wire, a precise positioning is required and thus work efficiency is bad. In the case of Patent Document 2, a triangle leg-shaped lead-in passage is defined by a pair of guide surfaces facing the wire insertion opening. Accordingly, it is unnecessary to precisely position the wire, thereby enhancing work efficiency. However, upon attachment to the wire, the wire guide piece is bent and the hook, which is hard to bend due to a rigidity thereof given for the purpose of supporting the wire, has also to be elastically deformed. Therefore, the elastic deformation of the hook acts as a resistance to the operation, and thus a large force is required to pass the wire. Further, when the wire guide piece is elastically deformed, a distal end thereof abuts against a lower surface of a locking claw and thus an amount of elastic deformation thereof is limited. Accordingly, in order to widen the wire insertion opening to a sufficient width to allow the wire to pass therethrough, the hook has to be elastically deformed and thus a strong force is required upon attachment to the wire. In order to solve this problem, it is conceivable to increase a movable range of the wire guide piece by increasing lengths of the wire guide piece and the hook, but there is a problem that a size of the cover-material fastening clip is increased. If the size of the clip is increased, a size of a groove provided in the cushion material has also to be increased. As a result, a space occupied by the components is increased, which hinders the degree of freedom in design or improvement in cushioning property.

The present invention has been made keeping in mind the problems of the above background arts, and an object thereof is to provide a cover-material fastening clip, in which it is possible to lock the cover-material fastening clip on a to-be-locked member, which is provided in a cushion material or the like, by a simple operation with a weak force, thereby providing a good work efficiency, but attachment strength thereof is high.

Means for Solving the Problems

The present invention is a cover-material fastening clip for connecting a cover material with a cushion material, including a locking portion configured to be locked on a locking end member provided on an end edge of the cover material, and a hook configured to be locked on a to-be-locked member arranged in the cushion material, wherein the hook is provided below the locking portion and the hook includes an extension portion extending downward from the locking portion and a distal end portion extending laterally from a distal end of the extension portion, wherein the locking portion is provided with a guide piece, wherein the guide piece extends downward from the locking portion and includes a bent portion in the middle thereof to be bent and extended toward the distal end portion of the hook, wherein the guide piece is positioned such that an insertion opening having a predetermined gap and configured to allow the to-be-locked member to be inserted therethrough is formed between the bent portion and the distal end portion, wherein a distal end portion of the guide piece extending from the bent portion is an elastic piece portion capable of being elastically deformed to be spaced from the distal end portion and thus to widen the insertion opening, wherein in a part of the locking portion, which is located within a range, in which the elastic piece portion can be elastically deformed and thus moved, an escape space is provided to allow the elastic piece portion to be positioned therein.

The locking portion may include a pair of locking claws and a locking claw base portion connected to base end portions of the locking claws, wherein the guide piece is provided on one of the pair of locking claws, wherein the hook is provided on a lower surface of the locking claw base portion opposite to an upper surface thereof, on which the locking claws are provided, wherein the escape space is formed by a groove portion provided at a location on the lower surface of the locking claw base portion closer to the guide piece than the hook.

Also, the locking portion may include a pair of locking claws and a locking claw base portion connected to base end portions of the locking claws, wherein the guide piece is provided on one of the pair of locking claws, wherein the hook is provided on a lower surface of the locking claw base portion opposite to an upper surface thereof, on which the locking claws are provided, wherein the escape space is formed by a through-hole provided at a location on the locking claw base portion closer to the guide piece than the hook so as to extend therethrough from the upper surface to the lower surface.

The locking portion may include a pair of locking claws and a locking claw base portion connected to base end portions of the locking claws, wherein the guide piece is provided on one of the pair of locking claws, wherein the hook is provided on a lower surface of the locking claw base portion opposite to an upper surface thereof, on which the locking claws are provided, wherein the escape space is provided in the locking claw base portion, wherein a reinforcing portion is provided on a part of the locking claw base portion adjacent to the escape space.

A reinforcing plate and a wider portion may be provided on the extension portion of the hook.

Advantageous Effects of Invention

According to the cover-material fastening clip of the present invention, it is possible to lock the cover-material fastening clip on the to-be-locked member, which is provided in the cushion material or the like, by a simple operation with a weak force, thereby providing a good work efficiency. In particular, the cover-material fastening clip can be attached to the to-be-locked member by elastically deforming only the guide piece, which is easy to bend. Also, the claw-shaped portion for supporting the to-be-locked member is reinforced and thus can be designed to have an increased rigidity, thereby enhancing attachment strength and also providing durability. Further, since a shape of the locking portion to be locked on the locking end member provided on an end edge of the cover material and a shape of the claw-shaped portion are not changed, the cover-material fastening clip can be attached to the locking end member and the cushion material having shapes similar to those in the related art.

DETAILED DESCRIPTION OF PREFERRED EMBODIMENTS

Figure 1:
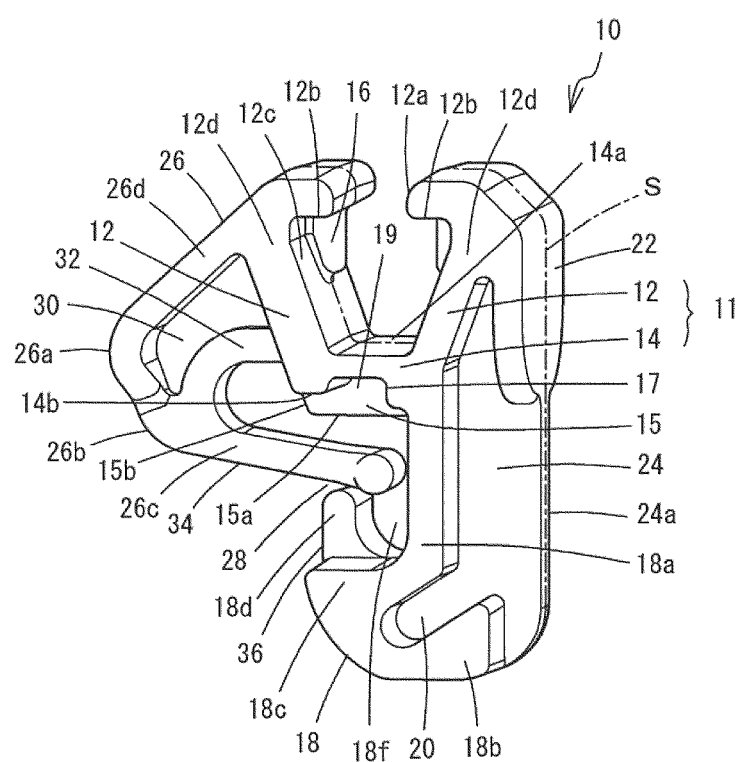
FIG. 1 is a perspective view of a cover-material fastening clip according to a first embodiment of the present invention.
Figure 2:
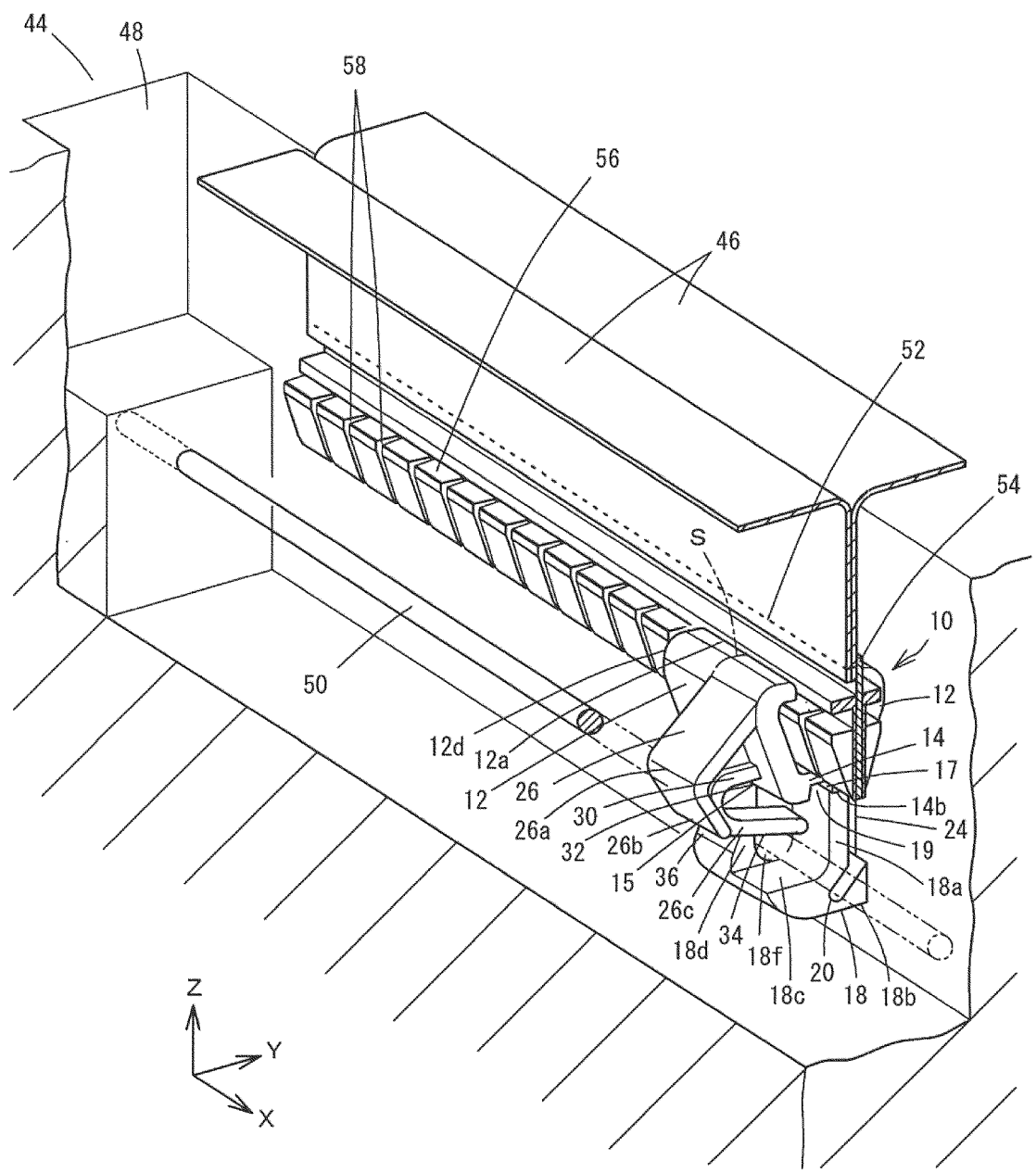
FIG. 2 is a perspective view showing a method of using the cover-material fastening clip according to the first embodiment of the present embodiment.

Hereinafter, embodiments of the present invention will be described with reference to the accompanying drawings. Also, for the description of a cover-material fastening clip 10, directions will be described with reference to XYZ axis directions perpendicular to each other as shown in FIG. 2. Herein, the X-axis direction is referred to as a forward and rearward direction and corresponds to a longitudinal direction of a wire 50 as a to-be-locked member arranged, for example, at a deep part of a groove 48 of a cushion material 44 as describe below, i.e., an inserting direction of the wire 50 which is inserted through the cushion material 44, and also to an direction along which an end edge of a cover material 46 extends. Also, the X-axis direction corresponds to a direction along which an end edge of a locking end member 56 as described below extends. A direction in which the locking end member 56 is inserted into the groove 48 of the cushion 44 to be locked onto the wire 50 is referred to as an upward and downward direction. The upward and downward direction is the Z-axis direction perpendicular to the X-axis direction and corresponds to a depth direction of the cushion material 44. Also, the upward and downward direction corresponds to a direction normal to an outer surface of the cover material 46, as described below, stretched on the cushion material 44. Further, a direction perpendicular to the X-axis direction, which is the forward and rearward direction, and the Z-axis direction, which is the upward and downward direction, is the Y-axis direction and is referred to as a right and left direction. A direction parallel to the right and left direction is also referred to as a lateral direction.

FIGS. 1 to 8 show a first embodiment of the present embodiment. A cover-material fastening clip 10 of the present embodiment is integrally molded of synthetic resin and has a pair of locking claws 12. The locking claws 12 have respectively arm portions 12d formed to oppose each other. Base end portions of the arm portions 12d (also referred to as base end portions of the locking claws 12) are integrally formed from both sides of an upper surface 14a of a locking claw base portion 14 (also referred to as one surface of the locking claw base portion 14). In other words, the locking claw base portion 14 is integrally formed on the base end portions of the arm portions 12d. The locking claws 12 are formed to protrude from the upper surface 14a in the upward direction in FIG. 3, so that a distance therebetween in the right and left direction is widened as they go upward. A locking portion 11 is formed by the locking claws 12 and the locking claw base portion 14.

Distal end portions 12a of the locking claws 12 are bent inward, i.e., in such directions that the distal end portions 12a face and approach each other. Each of the distal end portions 12a opposes the locking claw base portion 14 and has a locking surface 12b configured to be locked on the locking end member 56. The locking surface 12b is formed to be substantially parallel to the upper surface 14a of the locking claw base portion 14. The locking end member 56 is received and locked in a space surrounded by the pair of locking claws 12 and the locking claw base material 14.

Stoppers 16 are respectively provided on opposing inner surfaces 12c of the arm portions 12d of the pair of locking claws 12. Each of the stoppers 16 is a protrusion provided at a middle location of the respective locking claws 12 in a thickness direction thereof, which is the X-axis direction intersecting with a direction in which the locking claws 12 face each other, and has a length starting from the locking surface 12b of the respective locking claws 12 and reaching the middle of the inner surface 12c. A width of the stopper 16 in the thickness direction is substantially constant.

In addition, the cover-material fastening clip 10 is configured so that the X-axis direction is a width direction thereof and also a shape thereof is generally substantially symmetric with respect to a center line S of the cover-material fastening clip 10 in the width direction. One side of a lower surface 14b (also referred to as the other surface of the locking claw base portion 14) of the locking claw base portion 14 opposite to the upper surface 14a, which is delimited by the center line S, is configured as a reinforcing portion 15 protruding downward relative to the other side. The reinforcing portion 15 has a shape of a generally rectangular thin plate extending along the YZ plane and having a width half that of the locking claw base portion 14. An upper end edge portion of the reinforcing portion 15 is contiguous to the locking claw base portion 14 and a lower end edge portion 15a thereof is positioned slightly below the lower surface 14b of the locking claw base portion 14 to be parallel to the upper surface 14a. One side edge portion 15b of the reinforcing portion 15 intersecting with the lower end edge portion 15a is positioned slightly outside of an outer surface of the locking claw 12 to be parallel to the locking claw 12. The other side edge portion 15b intersecting with the lower end edge portion 15a is contiguous to an extension portion 18a of a hook 18 as described below. The other side of the lower surface 14b delimited by the center line S is provided with a groove portion 17.

The groove portion 17 has a depth obtained by cutting out a width, in the upward and downward direction, of the locking claw base portion 14, from a lower side thereof to about a half thereof. A width of the groove portion 17 in the Y-axis direction is about half that of the locking claw base portion 14. The groove portion 17 is provided to extend through the center, in the Y-axis direction, of the locking claw base portion 14 along the X-axis direction. One end portion of the groove portion 17 in the X-axis direction is opened to outside of the locking claw base portion 14 and the other end portion is closed due to the reinforcing portion 15 located thereat. The inside of the groove portion 17 is formed to have a range which allows an elastic piece portion 26c of a guide piece 26 as described below to be elastically deformed and thus is configured as an escape space 19 which allows a distal end portion of the elastic piece portion 26c, which is a portion thereof, to be inserted therein. Meanwhile, a portion of the lower surface 14b closer to the extension portion 18a than is the groove portion 17 is positioned below a portion opposite thereto, so that a thickness of the locking claw base portion 14 is increased.

A hook 18 is provided on the lower surface 14b of the locking claw base portion 14. The hook 18 is provided on one end portion of the lower surface 14b in the Y-axis direction, in which the pair of locking claws 12 face each other, and extends in the Z-axis direction. The hook 18 has the extension portion 18a extending to be substantially perpendicular to the lower surface 14b, and a claw-shaped portion 18c bent from a distal end of the extension portion 18a in the left direction in FIG. 3 and also protruding to be substantially parallel to the lower surface 14b. The claw-shaped portion 18c is provided with a distal end portion 18d on a side, which is located on the one side delimited by the center line S and on which the reinforcing portion 15 is provided. The distal end portion 18d has a width in the X-axis direction half that of the claw-shaped portion 18c. The distal end portion 18d protrudes to extend toward an end portion of the locking claw base portion 14 opposite to an end portion thereof, which is connected to the extension portion 18a, and a distal shape thereof is formed as a curved surface bulged outward. A U-shaped groove portion surrounded by the extension portion 18a, the claw-shaped portion 18c and the distal end portion 18d is formed to extend in the X-axis direction and defines a holding space 18f, through which a wire 50 as described below is to be inserted.

The cover-material fastening clip 10 is configured such that the X-axis direction is a width direction thereof and also a shape thereof is generally substantially symmetric with respect to the center line S of the cover-material fastening clip 10 in the width direction. The shape of the hook 18 in the X-axis direction is formed to have a constant width slightly shorter than a width of the locking claws 12. The extension portion 18a and the claw-shaped portion 18c of the hook 18 have the same width, and the distal end portion 18d has a width corresponding to a left half thereof with respect to the center line S in FIG. 6 and is provided to face the reinforcing portion 15.

On a distal end of the extension portion 18a of the hook 18, a flange portion 18b is provided to extend in a direction (right direction in FIG. 3) opposite to an extending direction of the claw-shaped portion 18c. The flange portion 18b is provided to extend toward the right side in the Y-axis direction in FIG. 3 to be generally perpendicular to the extending direction of the extension portion 18a. A corner portion between the extension portion 18a and the flange portion 18b is provided with a jig receiving portion 20 for receiving a jig (not shown) therein. The jig receiving portion 20 is a groove obtusely intersecting with a longitudinal direction of the extension portion 18a and is configured to terminate at a location where the jig receiving portion 20 does not reach an end edge portion of the flange portion 18b or an end edge portion of the claw-shaped portion 18c.

Figure 7:
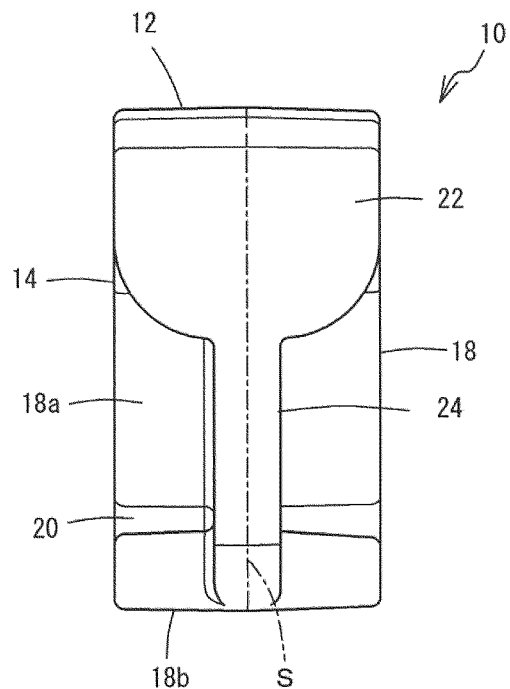
FIG. 7 is a right side view of the cover-material fastening clip according to the first embodiment of the present invention.

Among the pair of locking claws 12, a locking claw 12 on a side, on which the jig receiving portion 20 is formed (locking claw 12 on a side opposite to a part on which a guide piece 26 as described below is formed), is provided with a jig guide piece 22 integrally formed with the locking claw 12. The jig guide piece 22 is provided in the vicinity of a bent corner portion of the locking claw 12 and extends downward along the Z-axis direction to reach a lateral side of the locking claw base portion 14. A lower end portion of the jig guide piece 22 has a shape in the XZ plane formed in a curved line so that a location thereof at the center line S is lowest. As shown in FIG. 7, the jig guide piece 22 and the hook 18 are provided to have the same width in the X-axis direction. On the middles of the jig guide piece 22 and the hooks 18 in the X-axis direction, i.e., on parts thereof on the center line S, a reinforcing plate 24 is provided to extend along the YZ plane. The reinforcing plate 24 is formed to have a constant thickness in the X-axis direction and has a shape of a generally rectangular thin plate contiguous to the jig guide piece 22 and the hook 18. A side edge portion 24a of the reinforcing plate 24 is contiguous to an outer surface of the jig guide piece 22. The side edge portion 24a is formed as a straight line parallel to the extension portion 18a. A portion of the reinforcing plate 24 contiguous to the flange portion 18b is rounded to be contiguous to a lower surface of the flange portion 18b.

Among the pair of locking claws 12, a locking claw 12 opposite to the locking claw 12 on the side, on which the jig guide piece 22 is formed, is provided with a guide piece 26 integrally formed with the locking claw 12. The guide piece 26 is provided in the vicinity of a bent corner portion of the locking claw 12 and extends in an inclined direction extending downward as it goes away from the locking claw 12. The guide piece 26 has a first bent portion 26a provided in the vicinity of a lateral side of the locking claw base portion 14. Thus, the guide piece 26 is bent at the first bent portion 26a and then extends downward to be generally parallel to the locking claw 12. Also, a second bent portion 26b is provided in the vicinity of a location slightly below the locking claw base portion 14 and extends toward the vicinity of the middle of the extension portion 18a of the hook 18 to reach a location slightly spaced from the extension portion 18a.

Figure 6:
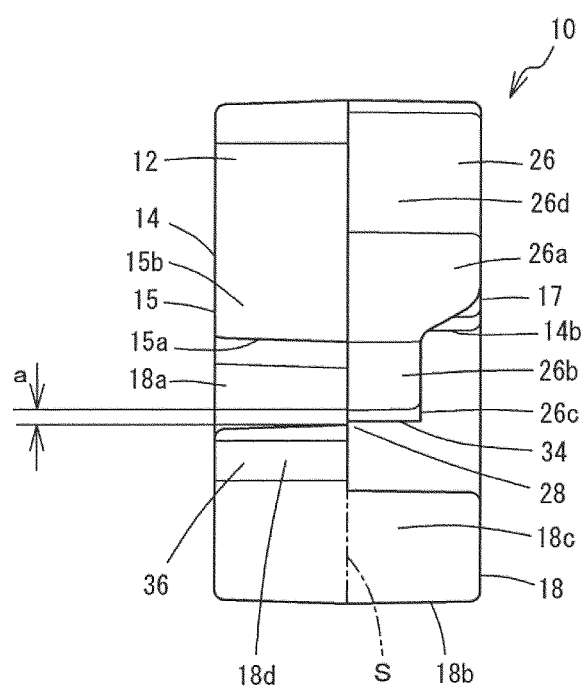
FIG. 6 is a left side view of the cover-material fastening clip according to the first embodiment of the present invention.

As shown in FIG. 6, a shape of the guide piece 26 in the X-axis direction is shaped such that an arm portion 26d thereof extending from a base end portion thereof to the first bent portion 26a is provided on a right half side of the locking claw 12 with respect to the center line S to have a width half that of the locking claw 12. A distal end portion extending from the second bent portion 26b is formed to be narrower than the width, so that one end portion thereof is formed along the center line S and the other end portion is positioned closer to the center line S than an end portion of the locking claw 12 to be parallel to the center line S. The distal end portion extending from the second bent portion 26b is a straight rod-shaped elastic piece portion 26c. A lower surface of the elastic piece portion 26c is a guide surface 34 as described below.

The elastic piece portion 26c of the guide piece 26 and the distal end portion 18d of the hook 18 are provided to be spaced from each other along an inserting direction of the wire 50, i.e., a direction parallel to the X-axis direction. As used herein, the term 'spaced' means a state where their positions are offset in the X-axis direction and also a state where, when one side is projected in a direction perpendicular to the X-axis direction, e.g., onto the XZ plane, the one side is likely to be in contact with the other side, but does not overlap therewith. The guide piece 26 and the hook 18 are provided to coincide with the X-axis direction at the vicinity of their base end portions. However, the elastic piece portion 26c of the guide piece 26 is positioned on the right side with respect to the center line S in FIG. 6 and the distal end portion 18d of the hook 18 is positioned on the left half side, so that they are spaced from each other and positioned in a staggered manner. That is, a center line of the elastic piece portion 26c of the guide piece 26 and a center line of the distal end portion 18d of the hook 18 are positioned to be spaced from and parallel to each other along an inserting direction of the wire 50, i.e., a direction parallel to the X-axis direction. Also, the guide surface 34 of the elastic piece portion 26c of the guide piece 26 is formed to be parallel to a direction, along which a groove-shaped holding space 18f of the hook 18 extends (X-axis direction).

Figure 3:
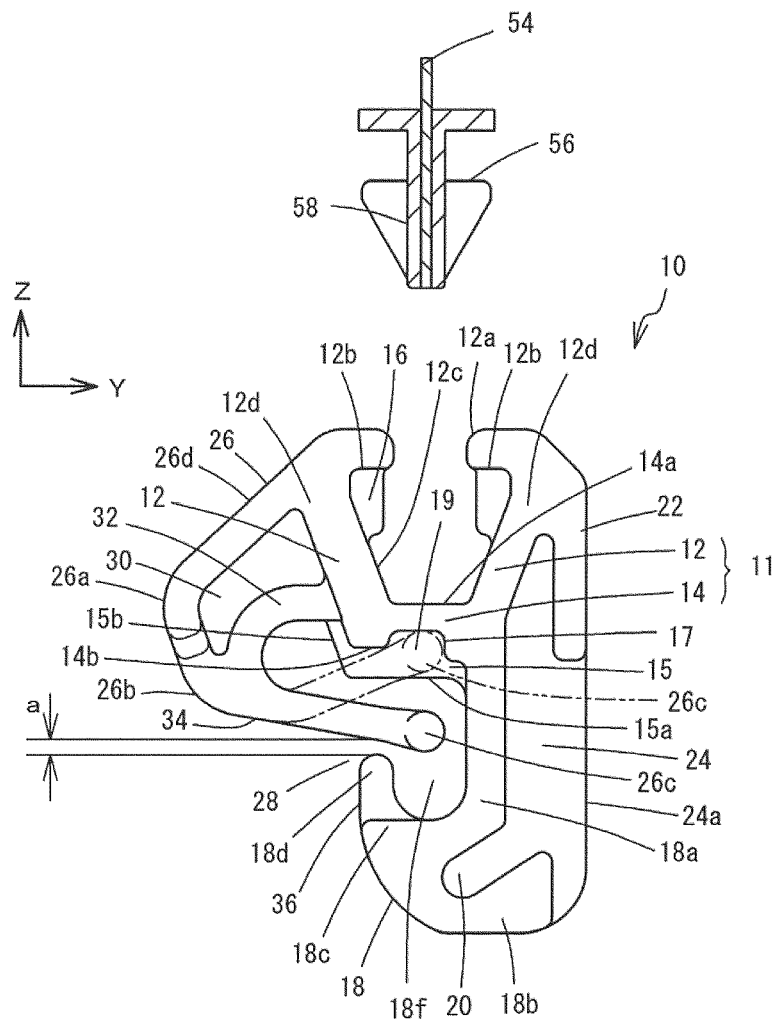
FIG. 3 is a front view showing the method of using the cover-material fastening clip according to the first embodiment of the present embodiment.
Figure 4:
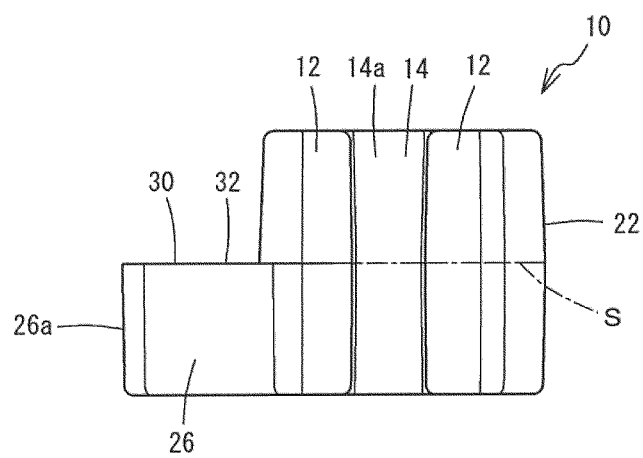
FIG. 4 is a top view of the cover-material fastening clip according to the first embodiment of the present invention.
Figure 5:
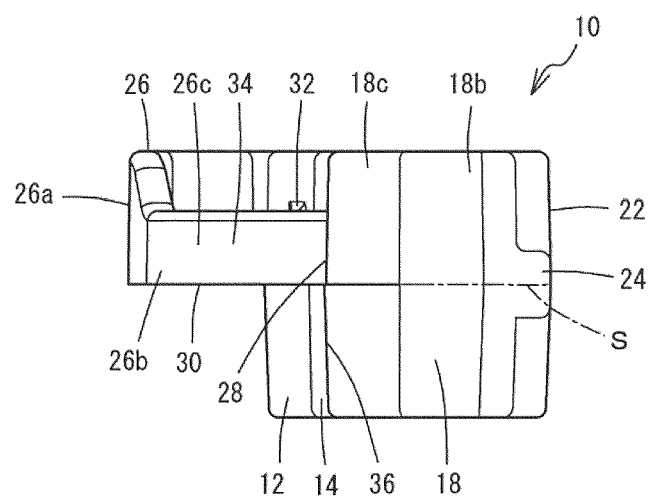
FIG. 5 is a bottom view of the cover-material fastening clip according to the first embodiment of the present invention.

A gap between the guide piece 26 and the hook 18 defines an insertion opening 28 configured to allow the wire 50 to be inserted therethrough. As viewed in the X-axis direction, the insertion opening 28 is configured to have a gap a smaller than a diameter of the wire 50 as shown in FIG. 3, thereby preventing the wire 50 from falling out after passing therethrough and thus reliably holding the wire 50 in the holding space 18f As viewed in the Y-axis direction, the insertion opening 28 is configured to be narrowest and thus to have the gap a in the vicinity of the center line S of the cover-material fastening clip 10 in the X-axis direction as shown in FIG. 6.

In FIG. 6, a part of the cover-material fastening clip 10, which is located on the right side in the X-axis direction with respect to the center line S, is configured such that the claw-shaped portion 18c of the hook 18 is positioned on a lower side thereof, thereby defining a space wider than the gap a. A section of the cover-material fastening clip 10, which is located on the left side in the X-axis direction with respect to the center line S, is configured such that the guide piece 26 is not provided thereon, thereby defining a space wider than the gap a. Therefore, since the wider spaces are provided on both sides of the center line S, it is possible to set the gap a to be significantly narrower than thicknesses of corresponding space portions of a mold used in manufacturing.

The second bent portion 26b of the guide piece 26 and the arm portion 26d connected to the locking claw base portion 14 of the locking claws 12 are provided with a wider portion 32 formed to be thick in the X-axis direction. The wider portion 32 is configured such that the vicinity of the center of the wider portion 32 is curved in a semi-circular shape toward the guide piece 26. A width of the wider portion 32 in the X-axis direction is the same as that of the elastic piece portion 26c of the guide piece 26 to be flush and contiguous with both side surfaces, in the X-axis direction, of the elastic piece portion 26c.

Figure 8:
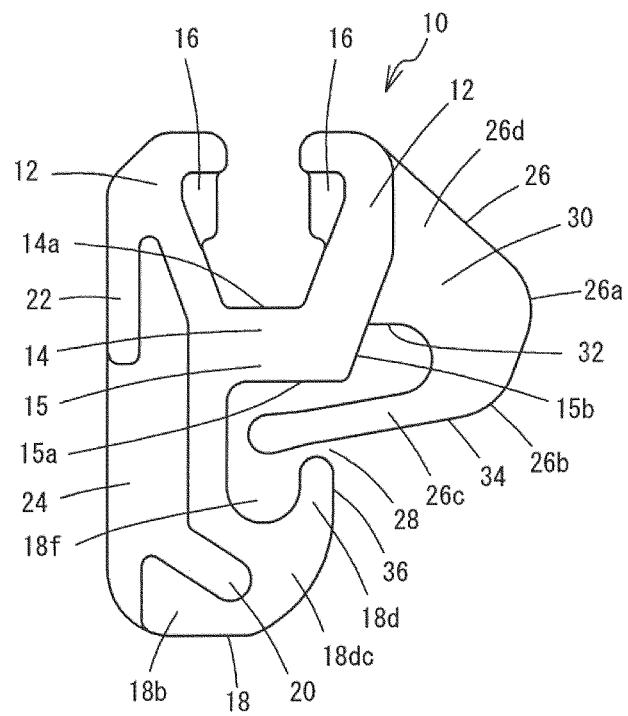
FIG. 8 is a rear view of the cover-material fastening clip according to the first embodiment of the present invention.

In a part surrounded by the guide piece 26, the locking claw 12 and the wider portion 32, a reinforcing plate 30 is provided to extend along the YX plane. The reinforcing plate 30 is formed to have a constant thickness thinner than the width of the wider portion 32 in the X-axis direction. The reinforcing plate 30 is provided adjacent to the middle, in the X-axis direction, of the locking claw 12, i.e., to be flush with one side surface of each of the guide piece 26 and the wider portion 32. As viewed from one side in the X-axis direction, the guide piece 26, the reinforcing plate 30 and the wider portion 32 are configured as a single plate body as shown in FIG. 8.

A lower surface of the elastic piece portion 26c of the guide piece 26 is the guide surface 34 facing the insertion opening 28. Also, an outer surface of the distal end portion 18d forms a guide surface 36 facing the insertion opening 28. The guide surfaces 34, 36 are configured such that a distance therebetween are gradually narrowed toward the insertion opening 28, thereby defining a lead-in passage having a triangle leg shape. Also, the elastic piece portion 26c of the guide piece 26 is positioned toward the extension portion 18a beyond the distal end portion 18d of the hook 18 and also above the holding space 18f. As such, it is possible to smoothly guide the wire 50 into the holding space 18f when the wire 50 is inserted therein.

Next, a method of using the cover-material fastening clip 10 of the present embodiment will be described with reference to FIGS. 2 and 3. As shown in FIG. 2, the cover-material fastening clip 10 is used to stretch a cover material 46 at a predetermined location on a surface of a cushion material 44 for a vehicle seat. Here, the cushion material 44 and the cover material 46 will be described. The cushion material 44 is a synthetic resin foam material, such as polyurethane foam, molded into a seat shape. The cushion material 44 has a groove 48 formed to allow the cover material to be fixed therein, and the wire 50 is installed in the groove 48. The wire 50 is a wire material made of metal and can be incorporated into the cushion material 44 by insert-molding during molding of the cushion material 64.

The cover material 46 is a leather, cloth or synthetic leather sheet or the like for covering the surface of the cushion material 44 and has a stitched portion 52 at a site thereof corresponding to the groove 48 of the cushion material 44. The stitched portion 52 is formed by aligning end edges of a pair of cover materials 46 with each other while surfaces thereof face each other, overlapping a locking tape 54 with the aligned end edges and then stitching them together. A locking end member 56 is integrally provided on a side edge of the locking tape 54 opposite to the stitched portion 52. The locking end member 56 is molded by synthetic reins to have a generally V-shaped cross-sectional shape and is formed along a longitudinal direction of the locking tape 54. The locking end member 56 is mounted on the locking tape 54 by insert-molding one side edge of the locking tape 54 therein. The locking end member 56 is sized to be fitted in between the pair of locking claws 12 of the cover-material fastening clip 10 and has locking grooves 58 formed at equal intervals along the longitudinal direction of the locking tape 54. A width and depth of the locking grooves 58 are set to allow the stoppers 16 of the cover-material fastening clip 10 to be inserted therein.

When the cover material 46 is stretched on the cushion material 44, the cover-material fastening clip 10 is first attached at any location on the locking end member 56 of the locking tape 54 attached to the cover material 46. A plurality of cover-material fastening clips 10 are attached along the longitudinal direction of the locking end member 56 at predetermined intervals. When the locking end member 56 is pressed in between the pair of locking claws 12, the pair of locking claws 12 are elastically deformed and widened and thus the locking end member 56 passes therebetween. Once the locking end member 56 passes therebetween, the elastic deformation of the locking claws 12 is restored and thus the distal end portions 12a of the pair of locking claws 12 cover an end portion of the locking end member 56 facing the stitched portion 52. Then, the locking end member 56 is fitted between the pair of locking claws 12 and thus does not fall out therefrom. At this time, the stoppers 16 of the locking claws 12 are inserted into one of the locking grooves 58 of the locking end member 56. As a result, the cover-material fastening clip 10 is not able to be moved along the longitudinal direction of the locking end member 56 and is stopped at a predetermined location.

Subsequently, the stitched portion 52 of the cover material 46, to which the cover-material fastening clips 10 are attached, is arranged to coincide with the groove 48 of the corresponding cushion material 44, and then the hook 18 of each of the cover-material fastening clips 10 is pressed against the wire 50 by a finger or the like. At this time, it is preferable to move the cover-material fastening clip 10 in the right and left direction in order to cause the wire 50 to coincide with the wire insertion opening 28. In this state, if the cover-material fastening clip 10 is further pressed in, the wire 50 is positioned in the lead-in passage between the guide surfaces 34, 36 facing the insertion opening 28 and then is led into the insertion opening 28. Since the wire insertion opening 28 is configured so that the narrowest width in the vicinity of the center line S is a and smaller than a diameter of the wire 50, the insertion opening 28 does not allow the wire 50 to pass therethrough as it is. However, in this state, if the cover-material fastening clip 10 is further pressed from above, the guide piece 26 is elastically deformed so that the insertion opening 28 becomes wider than the diameter of the wire 50. As a result, the wire 50 enters the wire holding space 18f through the insertion opening 28. At this time, the wire 50 hits against the extension portion 18a due to a momentum thereof upon passing, and after the wire 50 passes through the insertion opening 28, the elastic deformation of the elastic piece portion 26c is restored, thereby generating a click feeling. The insertion opening 28 is restored so that the width thereof in the vicinity of the center line S becomes the gap a, thereby preventing the wire 50 from falling out therethrough. In this way, the cover-material fastening clips 10 are locked on the wire 50, and the cover materials 46 attached to the cover-material fastening clips 10 are attached on the surface of the cushion material 44 with the end edges thereof inserted in the groove 48. When the elastic piece portion 26c is elastically deformed, the elastic piece portion 26c is moved toward the lower surface 14b of the locking claw base portion 14. However, since the lower surface 14b is provided with the groove portion 17 and thus the elastic piece portion 26c is moved in the escape space 19, which is the inside of the groove portion 17, the elastic piece portion 26c does not abut against the locking claw base portion 14 and thus is not interfered by the locking claw base portion 14. Therefore, it is possible to elastically deform the elastic piece portion 26c by a required amount of deformation, thereby widening the insertion opening 28 to have a gap sufficient to allow the wire 50 to pass therethrough. In addition, by elastically deforming only the elastic piece portion 26c, the wire 50 can pass through the insertion opening 28 to be locked. Accordingly, it is unnecessary to elastically deform the hook 18.

Figure 9:
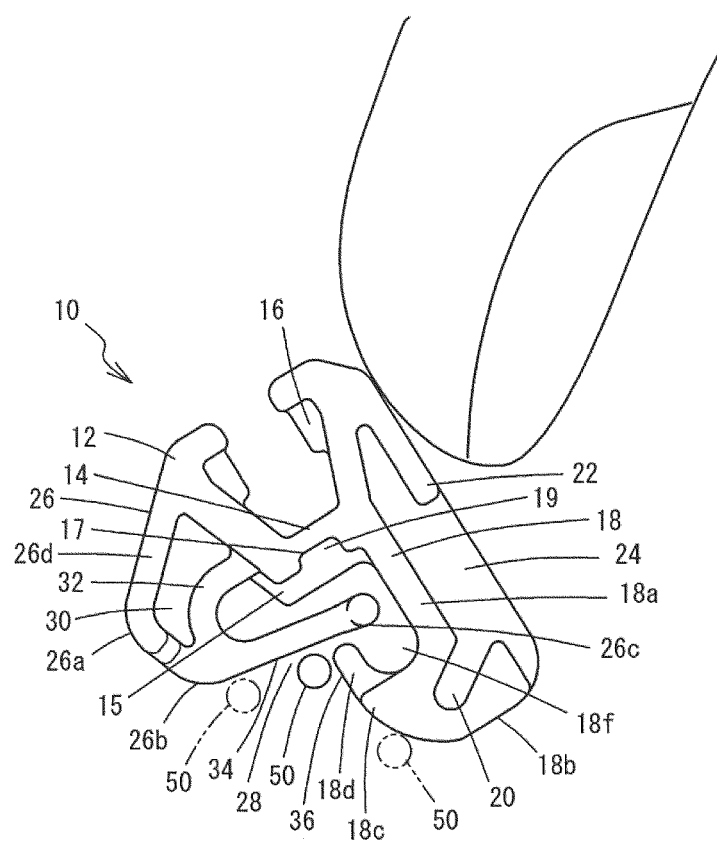
FIG. 9 is a front view showing a method of attaching the cover-material fastening clip according to the first embodiment of the present embodiment to a wire.
Figure 10:
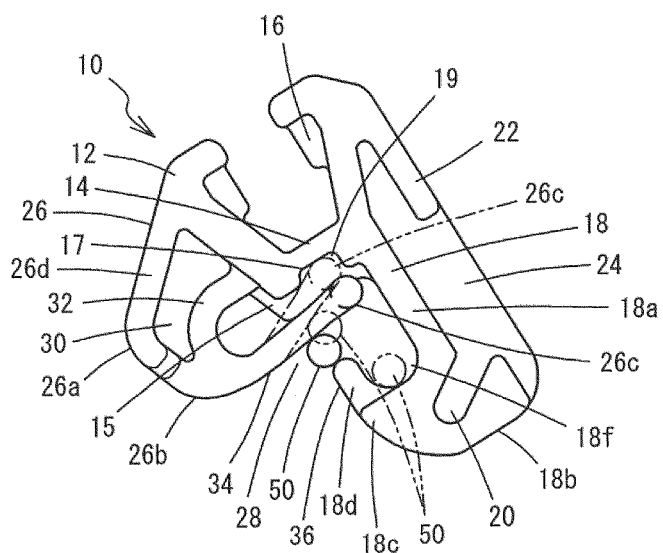
FIG. 10 is a front view showing the method of attaching the cover-material fastening clip according to the first embodiment of the present embodiment to the wire.

Also, as shown in FIG. 9, when the cover-material fastening clip 10 is attached while being held by a fingertip, the cover-material fastening clip 10 is inclined and thus the wire 50 is likely to be positioned on the right or left side of the insertion opening 28 in the figure as shown by a two-dot chain line. Even in this case, by moving the cover-material fastening clip 10 in the right and left direction, the wire 50 is guided by the guide surfaces 34, 36 and led into the insertion opening 28, so that the wire 50 is positioned at a location of a wire 50. In this state, as the cover-material fastening clip 10 is pressed from above, the elastic piece portion 26c is elastically deformed at the second bent portion 26b to approach the locking claw base portion 14 as shown in FIG. 10. Accordingly, the elastic piece portion 26c enters the escape space 19 so that the elastic piece portion 26c is elastically deformed to be largely bent. Thus, the insertion opening 28 is widened and thus the wire 50 can easily and reliably enter the holding space 18f to be locked therein. At this time, when the cover-material fastening clip 10 is pressed by the fingertip, the cover-material fastening clip 10 can be easily pressed by the fingertip due to the presence of the jig guide piece 22.

On the other hand, when the cover-material fastening clip 10 is separated from the wire 50, a long rod-shaped jig (not shown) is used. The jig is provided at a distal end thereof with a locking portion configured to be locked by the jig receiving portion 20 and the jig guide piece 22 of the cover-material fastening clip 10. The jig is inserted into a part of the groove 48 of the cushion material 44, in which the jig receiving portion 20 of the cover-material fastening clip 10 is located, and then is inserted and pressed in between the jig guide piece 28 and the jig receiving portion 20. Then, the locking portion on the distal end of the jig is locked in the jig receiving portion 20.

Subsequently, if the jig is drawn up, a moment is exerted on the cover-material fastening clip 10 so that the cover-material fastening clip 10 is rotated counterclockwise about the wire 50. Then, the wire 50 is guided by the distal end portion 18d of the hook 18 and the elastic piece portion 26c of the guide piece 26 and thus is positioned in the insertion opening 28. In this state, when the cover-material fastening clip 10 is further drawn up, the wire 50 hits against the elastic piece portion 26c and thus the elastic piece portion 26c is elastically deformed in a direction, in which the elastic piece portion 26c approaches the locking claw base portion 14, thereby widening the insertion opening 28. Eventually, the wire 50 passes through the widened insertion opening 28. In this way, the cover-material fastening clip 10 is separated from the wire 50 and thus the cover material 46 can be also separated from the cushion material 44. At this time, when the elastic piece portion 26c is elastically deformed, the elastic piece portion 26c is likewise inserted into the groove portion 17 of the locking claw base portion 14. Accordingly, the elastic piece portion 26c can be elastically deformed by a required amount of deformation without hitting against the locking claw base portion 14, thereby facilitating widening the insertion opening 28 and thus separating the cover-material fastening clip 10 from the wire 50.

According to the cover-material fastening clip 10 of the present embodiment, it is possible to lock the cover-material fastening clip 10 on the wire 50, which is provided in the cushion material 44 or the like, by a simple operation with a weak force, thereby providing a good work efficiency. In particular, the cover-material fastening clip 10 can be locked on the wire 50 by simply elastically deforming the elastic piece portion 26c of the guide piece 26. Also, the hook 18 for supporting the wire 50 can be designed to have an increased rigidity, thereby enhancing attachment strength and also providing durability. A shape of the locking portion 11 to be locked on the locking end member 56 provided on an end edge of the cover material 46 and a shape of the hook 18 to be locked on the wire 50 are not changed. Accordingly, the cover-material fastening clip 10 can be attached to the locking end member 56 and the cushion material 64 having shapes similar to those in the related art. Within a range, in which the elastic piece portion 26c of the guide piece 26 can be elastically deformed and thus moved, the groove 17 is formed in the lower surface 14b of the locking claw base portion 14 and thus the escape space 19 is provided therein. Accordingly, it is possible to elastically deform the elastic piece portion 26c by a required amount of deformation, thereby easily and reliably locking the wire 50 into the locking portion 11.

The guide piece 26 has a width half that of the locking claws 12 and the second bent portion 26b is formed to be narrower than the width, thereby facilitating bending thereof by elastic deformation. The guide piece 26 is provided with the first bent portion 34a and the second bent portion 34b, so that the guide piece 26 is spaced from the extension portion 18a of the hook 18. Thus, it is possible to increase a length of the guide piece 26, thereby facilitating bending thereof by elastic deformation. Therefore, even if the elastic piece portion 26c is made of the same material and has the same cross-sectional shape, the elastic piece portion 26c can be easily elastically deformed, thereby facilitating passing the wire 50 therethrough. Although the elastic piece portion 26c is formed to be longer, the lower surface 14b of the locking claw base portion 14 is provided with the escape space 19 due to the groove portion 17, thereby preventing deformation of the elastic piece portion 26c from being limited as the distal end thereof abuts against the locking claw base portion 14. As a result, it is possible to smoothly widen the insertion opening 28.

The base end portion of the hook 18 is formed to have a thickness twice that of the distal end portion 18d and also the base end portion of the guide piece 26 is formed to be thicker than the elastic piece portion 26c, thereby providing an enhanced strength. Also, the holding space 18f of the hook 18 is provided by the extension portion 18a and the distal end portion 18d opposing each other in the Y-axis direction perpendicular to the inserting direction of the wire 50, thereby clamping the wire 50 from both sides thereof and thus providing an enhanced attachment strength. Further, the cover-material fastening clip 10 is provided with the reinforcing portion 15, the reinforcing plates 24, 30 and the wider portion 32 to have an increased rigidity, thereby obtaining durability and also enhancing attachment strength. It is unnecessary to elastically deform parts of the cover-material fastening clip 10 other than the elastic piece portion 26c when the cover-material fastening clip 10 is attached to the wire 50, thereby allowing a shape having an increased rigidity to be given thereto.

Also, when the cover-material fastening clip 10 is attached to the wire 50, if the cover-material fastening clip 10 is inserted into the groove 48 of the cushion material 44 by pressing the jig receiving portion 20 while holding the cover-material fastening clip 10 by a finger, the cover-material fastening clip 10 is pressed down against a force pulled by the cover material 46 and thus the entire cover-material fastening clip 10 is likely to be inclined. However, the insertion opening 28 is oriented downward and also the triangle leg-shaped lead-in passage defined by the guide surface 34 and the guide surface 36 facing the insertion opening 28 is formed to be flared downward. Accordingly, even in the inclined state, the cover-material fastening clip 10 can be easily locked on the wire 50 only by pressing the cover-material fastening clip 10 against the wire 50 generally in the vicinity of the insertion opening 28. Thus, even when the wire 50 is offset from the insertion opening 28, the wire 50 can be guided by the guide surfaces 34, 36 to coincide with the insertion passage 28, simply by pressing the cover-material fastening clip 10 over a wide range as shown in FIG. 9 and thus moving the cover-material fastening clip 10 in the right and left direction. Accordingly, the locking operation can be simply performed. Also, since it is unnecessary to precisely position the cover-material fastening clip 10, the cover-material fastening clip 10 can be simply operated within the groove 48 of the cushion material 44. For example, it is unnecessary to press and deform the cushion material 44 so that the wire 50 is visible. Thus, the operation can be effectively performed with a weak force and does not require skills, so that the cover-material fastening clip 10 can be simply attached by any persons. Further, the cover-material fastening clip 10 can be separated from the wire 50 by a simple operation using the jig. In addition, since the elastic piece portion 26c is moved into the escape space 19, the operation can be also performed with a weak force, thereby enhancing work efficiency thereof.

Since the locking claws 12 are provided with the stoppers 16 and also the stoppers 16 are inserted into the locking grooves 58 of the locking end member 56, the cover-material fastening clip 10 is locked at a certain location and is not able to be moved along the longitudinal direction of the locking tape 54. Therefore, the cover material 46 is not displaced relative to the cushion material 44 and wrinkles or sagging is not occurred in the cover material 46. Thus, the cover material 46 can be neatly attached so that a good appearance is obtained. Since the locking end member 56 has the locking grooves 58 formed at equal intervals, flexibility thereof is increased and the operation is facilitated.

Since a shape of the locking portion 11 to be locked on the locking end member 56 provided on an end edge of the cover material 46 and a shape of the claw-shaped portion 18c are not changed, the cover-material fastening clip 10 can be attached to the locking end member 56 and the cushion material 64 having shapes similar to those in the related art. Further, it is possible to increase a movable range of the elastic piece portion 26c without increasing lengths of the guide piece 26 and the hook 18, thereby maintaining the cover-material fastening clip 10 in a compact size.

Further, the elastic piece portion 26c of the guide piece 26 extends beyond the distal end portion 18d of the hook 18 and reaches the vicinity of the extension portion 18a of the hook 18. Also, the elastic piece portion 26c is positioned to protrude at an angle nearly parallel to a bottom portion of the holding space 18. Accordingly, the wire 50 inserted in the holding space 18f abuts against the elastic piece portion 26c when moving toward the insertion opening 28, so that the wire 50 is carelessly separated from the cover-material fastening clip 10, thereby preventing the wire 50 from being carelessly separated therefrom.

The vicinity of the distal end portion of the elastic piece portion 26c has a straight line shape substantially perpendicular to the extension portion 18a of the hook 18, and the wire 50, which has passed through the insertion opening 28, is guided by the distal end portion of the elastic piece portion 26c to strongly hit against the extension portion 18a in a direction substantially perpendicular thereto. Thus, when the wire 50 enters the holding space 18f, a click feeling can be reliably generated, and as a result, it can be confirmed that the cover-material fastening clip 10 is attached to the wire 50. When the cover-material fastening clip 10 is separated from the wire 50, the wire 50 abuts against the distal end portion of the elastic piece portion 26c in a direction intersecting with an extending direction thereof, so that the elastic piece portion 26c can be easily elastically deformed, thereby allowing separation of the cover-material fastening clip 10. The elastic piece portion 26c is narrower, and as a result, the elastic deformation is facilitated as well.

Since the insertion opening 28 is provided with wider spaces on both sides of the center line S in the X-axis direction, the width a of the insertion opening 28 in the vicinity of the center line S can be set to be narrower than a thickness of a mold used in manufacturing, so that the wire 50 is difficult to be separated and thus can be securely held. The elastic piece portion 26c of the guide piece 26 and the distal end portion 18d of the hook 18 are provided in a staggered manner to provide certain wider spaces in different directions, thereby allowing the mold to be removed in the different directions and also making the insertion opening 28 narrower. In this way, the insertion opening 28 can be set to be narrower without being influenced by the mold. A thickness of the mold can be increased to enhance durability of the mold, and thus the mold having the enhanced durability can be used.

Also, urethane, which is a material for the cushion material 44, tends to be adhered on the wire 50 and thus is likely to interfere with locking of the cover-material fastening clip 10. However, since the wider spaces are provided around the insertion opening 28, the urethane can be displaced into gaps if the cover-material fastening clip 10 is strongly pressed against the wire 50, thereby ensuring a reliable locking of the cover-material fastening clip 10. Since the insertion opening 28 is narrowest in the vicinity of the centerline S and thus has a small contact surface with the urethane, the cover-material fastening clip 10 can be also attached while peeling the urethane off the wire 50. Therefore, it is unnecessary to make the efforts to previously remove the urethane adhered on the wire 50, thereby enhancing the work efficiency.

Figure 11:
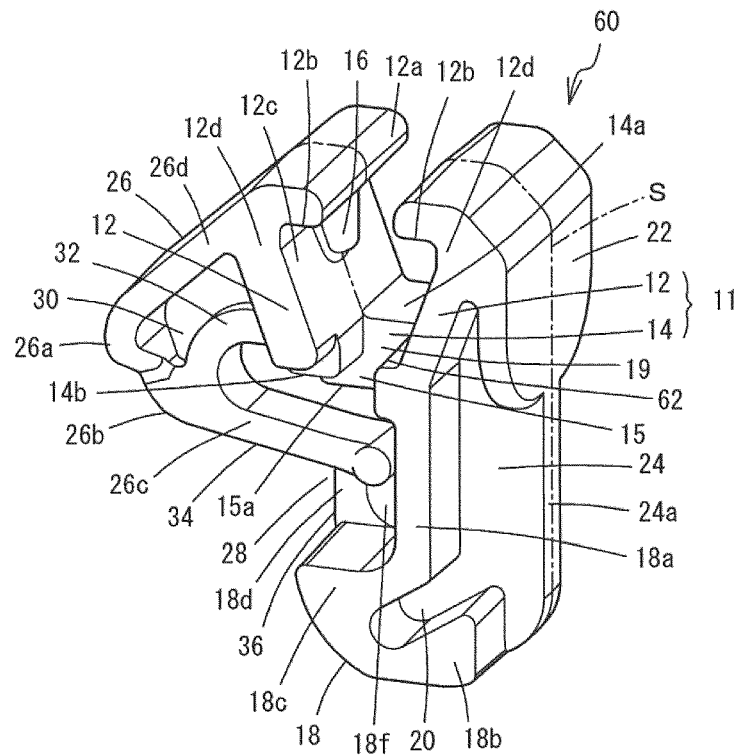
FIG. 11 is a perspective view of a cover-material fastening clip according to a second embodiment of the present invention.
Figure 12:
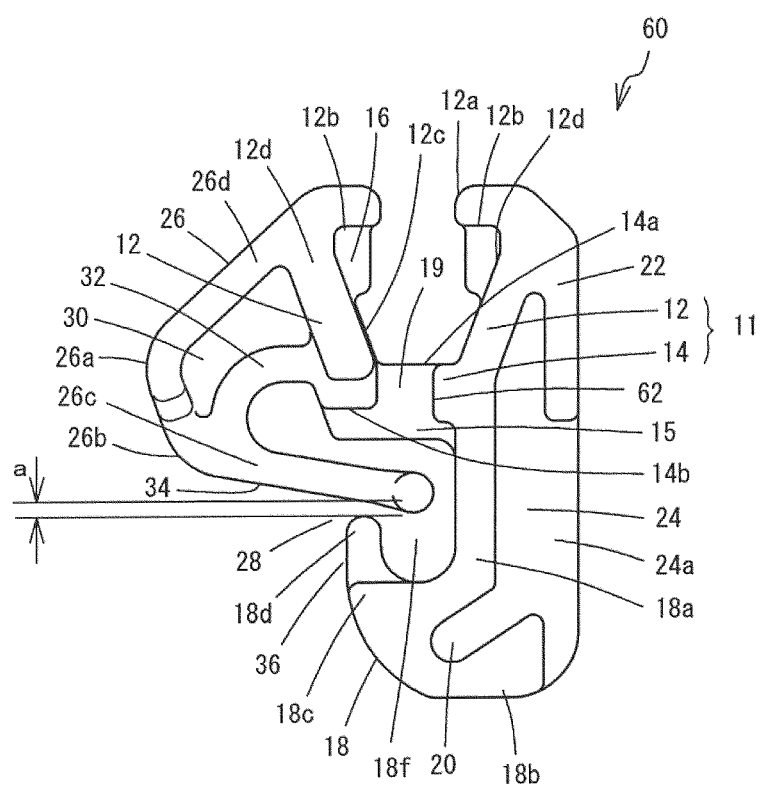
FIG. 12 is a front view of the cover-material fastening clip according to the second embodiment of the present invention.
Figure 13:
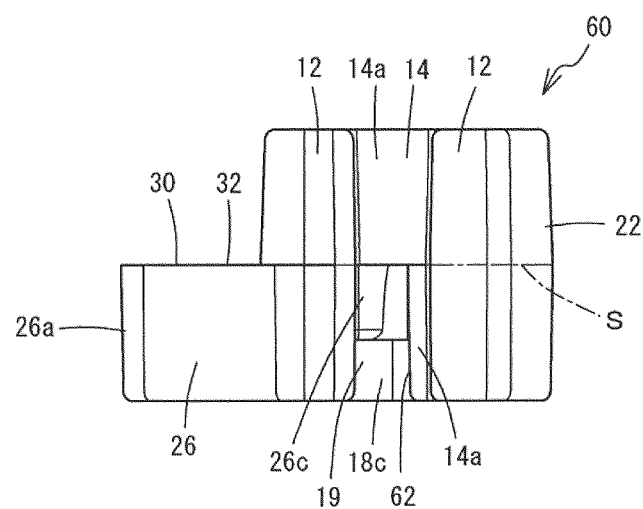
FIG. 13 is a top view of the cover-material fastening clip according to the second embodiment of the present invention.

Next, a second embodiment of the present invention will be described with reference to FIGS. 11 to 13. Herein, the same members as those of the foregoing embodiments are denoted by the same reference numerals and the descriptions thereof will be omitted. A cover-material fastening clip 60 of the present embodiment is also configured such that one side of a locking claw base portion 14, which is delimited by a center line S, is a reinforcing portion 15 protruding downward relative to the other side. The other side delimited by the center line S is provided with a through-hole 62 extending through the locking claw base portion 14 in the upward and downward direction. A width of the through-hole 62 in the Y-axis direction is about half that of the locking claw base portion 14. The through-hole 62 extends through the center, in the Y-axis direction, of the locking claw base portion 14 and thus is communicated with an outer surface, in the X-axis direction, of the locking claw base portion 14. The inside of the through-hole 62 is configured as an escape space 19 which allows an elastic piece portion 26c of an guide piece 26 as described below to be elastically deformed and inserted therein. Meanwhile, a portion of a lower surface 14b closer to the extension portion 18a than is the through-hole 62 is positioned below a portion opposite thereto, so that a thickness of the locking claw base portion 14 is increased.

The cover-material fastening clip 60 of the present embodiment is used in a similar manner to that of the foregoing embodiment and has effects similar thereto. In particular, since the through-hole 62 extends to reach an upper surface 14a, the escape space 19 can be increased in size.

Figure 14:
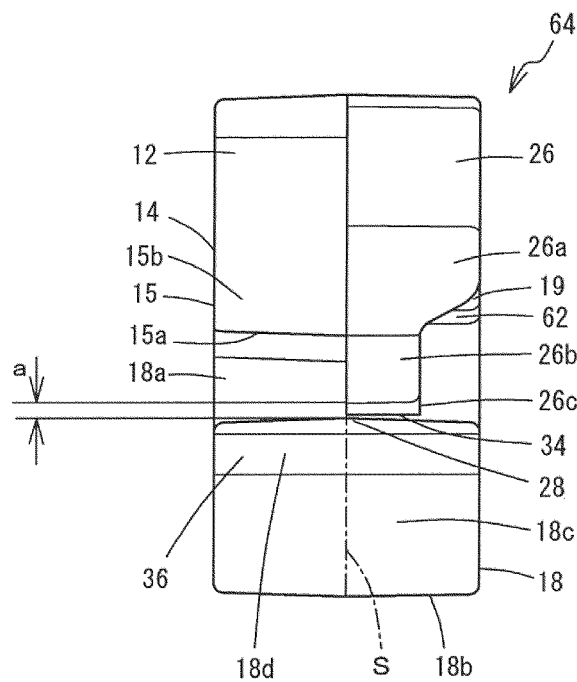
FIG. 14 is a left side view of a cover-material fastening clip according to a third embodiment of the present invention.

Next, a third embodiment of the present invention will be described with reference to FIG. 14. Herein, the same members as those of the foregoing embodiments are denoted by the same reference numerals and the descriptions thereof will be omitted. A cover-material fastening clip 64 of the present embodiment is configured such that a distal end portion 18d of a hook 18 has a width in the X-axis direction equal to that of a claw-shaped portion 18c. A cross-sectional shape of the distal end portion 18d in the YZ plane is substantially constant. The distal end portion 18d protrudes to extend toward an end portion opposite to an end portion thereof, which is connected to the extension portion 18a, and a distal shape thereof is formed as a curved surface bulged outward. A U-shaped groove portion surrounded by the extension portion 18a and the distal end portion 18d is formed to extend in the X-axis direction and defines a holding space 18f, through which a wire 50 is to be inserted.

A width of the distal end portion 18d in the X-axis direction is not limited to the present embodiment, but can be freely set. Also, the distal end portion 18d may be provided at any location, in the X-axis direction, on the claw-shaped portion 18c. The distal end portion 18d and the elastic piece portion 26c of the guide piece 26 may be provided to reach locations overlapping each other as viewed in the X-axis direction, and also may be provided to partially or entirely overlap each other.

The cover-material fastening clip 64 of the present embodiment is used in a similar manner to that of the foregoing embodiment and has effects similar thereto.

Additionally, the cover-material fastening clip of the present invention is not limited to the foregoing embodiments, but detailed shapes, dimensions and the like thereof may be appropriately changed. A material, surface finish, color and the like for the cover-material fastening clip can be freely selected. Although the cover-material fastening clip has been described as being formed such that a width in a thickness direction intersecting with a direction, in which the pair of the locking claws face each other, is set to be relatively wide at the locking claws and the locking claw base portion, to be relatively narrow at the guide piece, and to be narrower than the guide piece at the elastic piece portion, they may have the same width or may be configured in reverse. But, it is preferable that the guide piece has a narrow width in order to ensure deformability thereof. Although the guide piece and the elastic piece portion are provided to be positioned adjacent the center line S, they may be provided at a position offset from the center line S. Further, a shape of the locking portion is sufficient if the locking portion can be reliably attached to the locking end member. Also, although in the foregoing embodiments, the distal end portions of the locking claws has been described as being formed in a chamfered shape, the distal end portions may have a rectangular shape. But, the chamfered shape can reduce catching of the locking claws on the locking end member. Further, if the to-be-locked member allows the locking portion to be locked thereon, materials or shapes other than the wire do not matters. For example, the to-be-locked member may be made of resin and have a shape, which allows the hook of the cover-material fastening clip to be caught thereon.

REFERENCE NUMERALS LIST 10, 60, 64 Cover-material fastening clip
11 Locking portion
12 Locking claw
14 Locking claw base portion
14a Upper surface
14b Lower surface
15 Reinforcing portion
17 Groove portion
18 Hook
18a Extension portion
18d Distal end portion
19 Escape space
24, 30 Reinforcing plate
26 Guide piece
26a First bent portion
26b Second bent portion
26c Elastic piece portion
26d Arm portion
28 Insertion opening
32 Wider portion
44 Cushion material
46 Cover material
48 Groove
50 Wire
56 Locking end member

The invention claimed is:

1. A cover-material fastening clip for connecting a cover material with a cushion material, comprising a locking portion configured to be locked on a locking end member provided on an end edge of the cover material, and a hook configured to be locked on a to-be-locked member installed in the cushion material,
   wherein the hook is provided below the locking portion and the hook comprises an extension portion extending downward from the locking portion and a distal end portion extending laterally from a distal end of the extension portion,
   wherein the locking portion is provided with a guide piece,
   wherein the guide piece extends downward from the locking portion and comprises a bent portion in the middle thereof to be bent and extended toward the distal end portion of the hook, wherein the guide piece is positioned such that an insertion opening having a predetermined gap and configured to allow the to-be-locked member to be inserted therethrough is formed between the bent portion and the distal end portion,
   wherein a distal end portion of the guide piece extending from the bent portion is an elastic piece portion capable of being elastically deformed to be spaced from the distal end portion of the hook and thus to widen the insertion opening, wherein in a part of the locking portion, which is located within a range, in which the elastic piece portion can be elastically deformed and thus moved, an escape space is provided to allow the elastic piece portion to be positioned therein, and
   wherein the locking portion comprises a pair of locking claws and a locking claw base portion connected to base end portions of the locking claws, wherein the guide piece is provided on one of the pair of locking claws, wherein the hook is provided on a lower surface of the locking claw base portion opposite to an upper surface thereof, on which the locking claws are provided, wherein the escape space is formed by a groove portion provided at a location on the lower surface of the locking claw base portion closer to the guide piece than the hook.

2. A cover-material fastening clip for connecting a cover material with a cushion material, comprising a locking portion configured to be locked on a locking end member provided on an end edge of the cover material, and a hook configured to be locked on a to-be-locked member installed in the cushion material, wherein the hook is provided below the locking portion and the hook comprises an extension portion extending downward from the locking portion and a distal end portion extending laterally from a distal end of the extension portion, wherein the locking portion is provided with a guide piece, wherein the guide piece extends downward from the locking portion and comprises a bent portion in the middle thereof to be bent and extended toward the distal end portion of the hook, wherein the guide piece is positioned such that an insertion opening having a predetermined gap and configured to allow the to-be-locked member to be inserted therethrough is formed between the bent portion and the distal end portion, wherein a distal end portion of the guide piece extending from the bent portion is an elastic piece portion capable of being elastically deformed to be spaced from the distal end portion of the hook and thus to widen the insertion opening, wherein in a part of the locking portion, which is located within a range, in which the elastic piece portion can be elastically deformed and thus moved, an escape space is provided to allow the elastic piece portion to be positioned therein, wherein the locking portion comprises a pair of locking claws and a locking claw base portion connected to base end portions of the locking claws, wherein the guide piece is provided on one of the pair of locking claws, wherein the hook is provided on a lower surface of the locking claw base portion opposite to an upper surface thereof, on which the locking claws are provided, wherein the escape space is formed by a through-hole provided at a location on the locking claw base portion closer to the guide piece than the hook so as to extend therethrough from the upper surface to the lower surface.

3. The cover-material fastening clip according to claim 2, wherein a reinforcing plate is provided on the extension portion of the hook.

4. A cover-material fastening clip for connecting a cover material with a cushion material, comprising a locking portion configured to be locked on a locking end member provided on an end edge of the cover material, and a hook configured to be locked on a to-be-locked member installed in the cushion material, wherein the hook is provided below the locking portion and the hook comprises an extension portion extending downward from the locking portion and a distal end portion extending laterally from a distal end of the extension portion, wherein the locking portion is provided with a guide piece, wherein the guide piece extends downward from the locking portion and comprises a bent portion in the middle thereof to be bent and extended toward the distal end portion of the hook, wherein the guide piece is positioned such that an insertion opening having a predetermined gap and configured to allow the to-be-locked member to be inserted therethrough is formed between the bent portion and the distal end portion, wherein a distal end portion of the guide piece extending from the bent portion is an elastic piece portion capable of being elastically deformed to be spaced from the distal end portion of the hook and thus to widen the insertion opening, wherein in a part of the locking portion, which is located within a range, in which the elastic piece portion can be elastically deformed and thus moved, an escape space is provided to allow the elastic piece portion to be positioned therein, wherein the locking portion comprises a pair of locking claws and a locking claw base portion connected to base end portions of the locking claws, wherein the guide piece is provided on one of the pair of locking claws, wherein the hook is provided on a lower surface of the locking claw base portion opposite to an upper surface thereof, on which the locking claws are provided, wherein the escape space is provided in the locking claw base portion, wherein a reinforcing portion is provided on a part of the locking claw base portion adjacent to the escape space.

5. The cover-material fastening clip according to claim 4, wherein a reinforcing plate is provided on the extension portion of the hook.

6. The cover-material fastening clip according to claim 1, wherein a reinforcing plate is provided on the extension portion of the hook.

* * * * *